United States Patent
Ceravalls Pujol et al.

(10) Patent No.: US 8,609,168 B2
(45) Date of Patent: Dec. 17, 2013

(54) FOOD COOKING CONTROL METHOD AND DEVICE

(75) Inventors: Joan Ceravalls Pujol, Barcelona (ES); Jose Bosch I Estrada, Barcelona (ES); Jose Maria Gomez Cama, Barcelona (ES); Francisco Miguel Tarzan Lorente, Barcelona (ES); Antonio Pardo Martinez, Barcelona (ES)

(73) Assignee: Point Just, S.L., Barcelona (ES)

( * ) Notice: Subject to any disclaimer, the term of this patent is extended or adjusted under 35 U.S.C. 154(b) by 1079 days.

(21) Appl. No.: 12/524,409

(22) PCT Filed: Jan. 24, 2008

(86) PCT No.: PCT/ES2008/000037
§ 371 (c)(1),
(2), (4) Date: Aug. 19, 2009

(87) PCT Pub. No.: WO2008/090250
PCT Pub. Date: Jul. 31, 2008

(65) Prior Publication Data
US 2009/0324785 A1 Dec. 31, 2009

(30) Foreign Application Priority Data
Jan. 24, 2007 (ES) .................................. 200700243

(51) Int. Cl.
*A01K 43/00* (2006.01)

(52) U.S. Cl.
USPC ........... 426/231; 426/233; 426/520; 426/523; 99/325; 99/331; 99/342; 374/10; 374/15; 374/29; 374/100

(58) Field of Classification Search
USPC ............ 426/231, 520, 233, 523; 99/325, 331, 99/342; 374/10, 15, 29, 100
See application file for complete search history.

(56) References Cited

U.S. PATENT DOCUMENTS

| | | | |
|---|---|---|---|
| 6,065,391 A * | 5/2000 | Archard et al. | 99/342 |
| 6,753,027 B1 * | 6/2004 | Greiner et al. | 426/233 |
| 2006/0185523 A1 * | 8/2006 | Wiedemann et al. | 99/331 |

FOREIGN PATENT DOCUMENTS

| | | | | |
|---|---|---|---|---|
| DE | 40 32 949 A1 | 4/1992 | | |
| EP | 1498057 | * 7/2004 | | A47J 27/62 |
| EP | 1 473 554 A1 | 11/2004 | | |
| EP | 1 688 721 A1 | 8/2006 | | |
| ES | 2 268 983 | 3/2007 | | |

OTHER PUBLICATIONS

International Search Report for PCT International Patent Application No. PCT/ES2008/000037 mailed Jun. 17, 2008.

* cited by examiner

*Primary Examiner* — Drew Becker
*Assistant Examiner* — Preston Smith
(74) *Attorney, Agent, or Firm* — RatnerPrestia

(57) ABSTRACT

The invention relates to a food cooking control method and device. The method includes the following steps in which: at least one temperature detection device is inserted into a food; a final equilibrium temperature is defined; the detection device is positioned inside the food in a pre-determined detection zone so that a temperature (TC) can be obtained at all times during cooking; the TC temperature data obtained are processed using the detection device; the temperature of the surface through which the food receives heat (TP) is determined and processed and the variation in temperature TC is evaluated at least to the first derivative. The device includes a detection device intended to be inserted into the food, a device for determining the thickness of the food and a device for inserting the detection device into the food to a pre-determined depth.

12 Claims, 5 Drawing Sheets

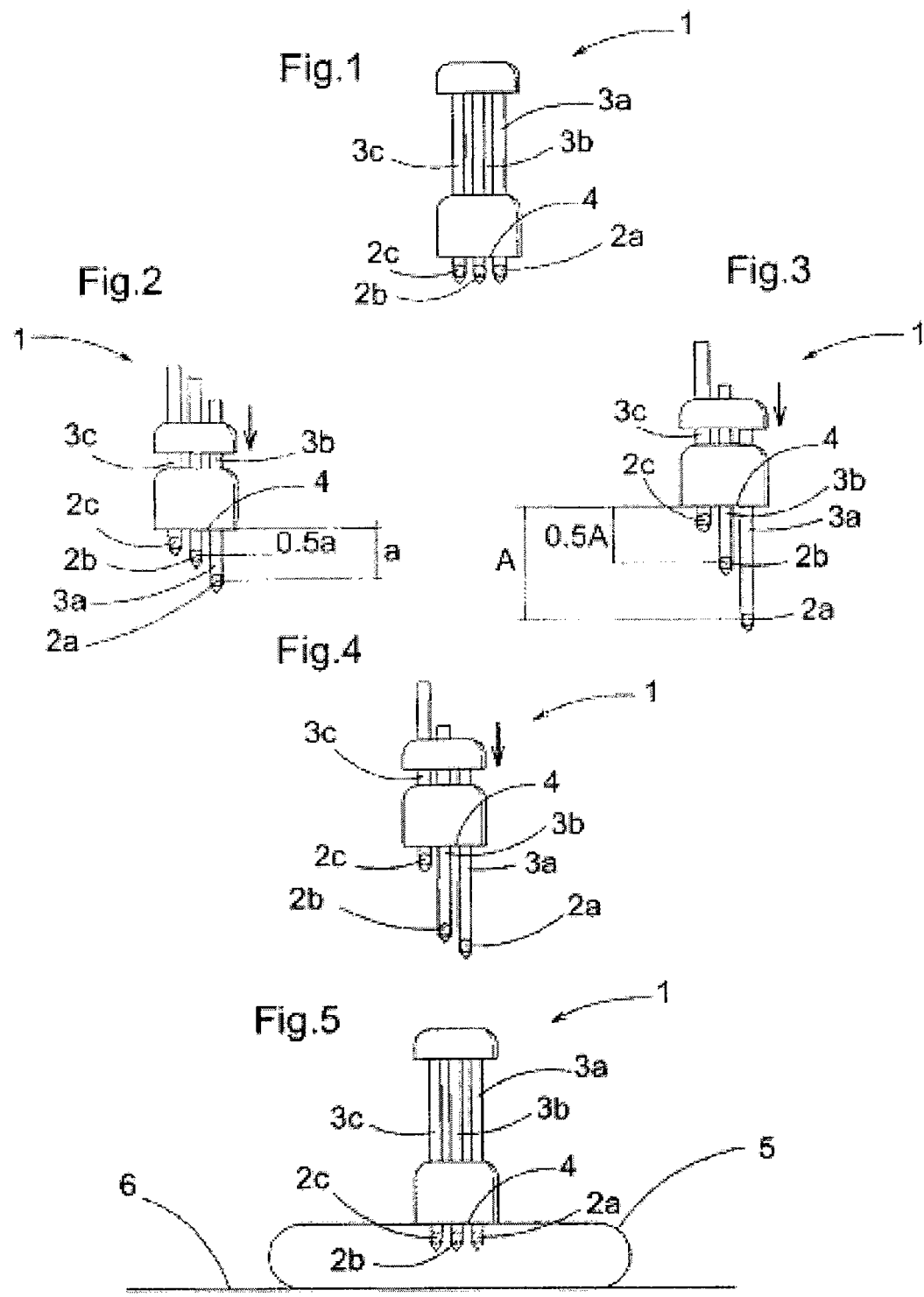

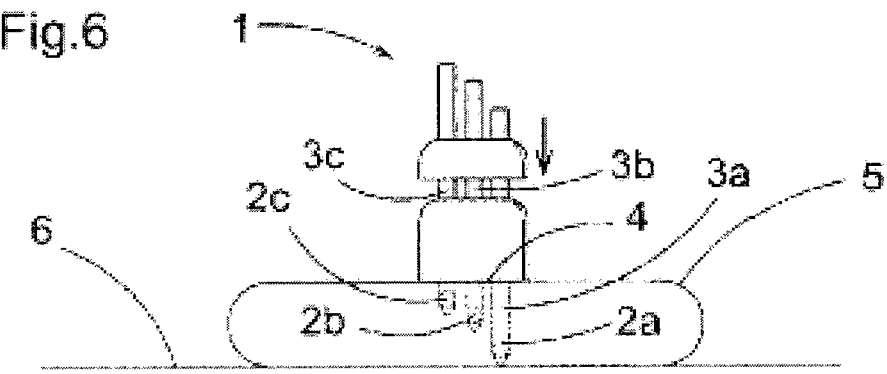
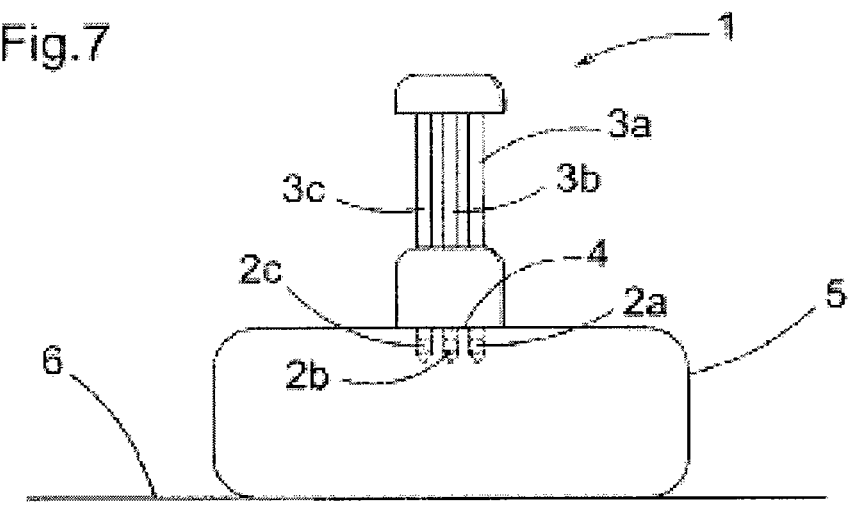
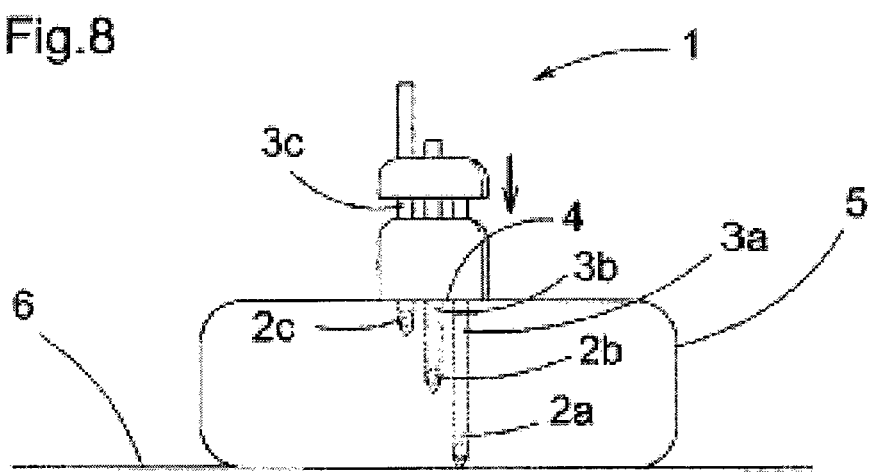

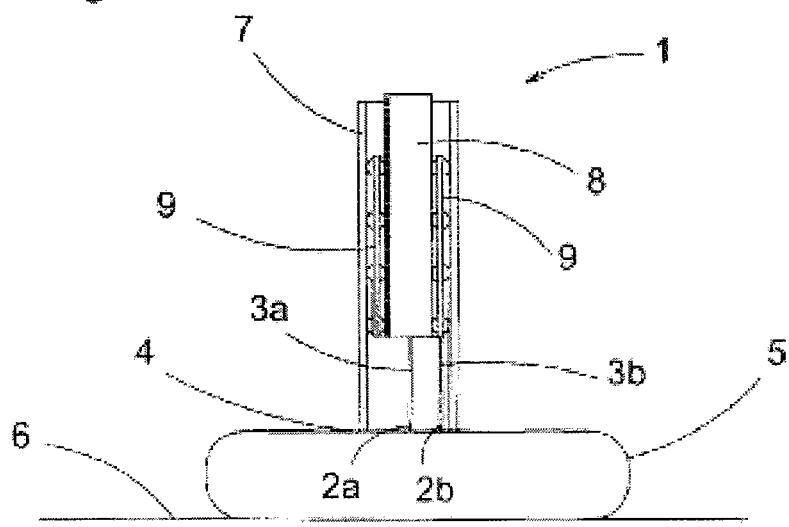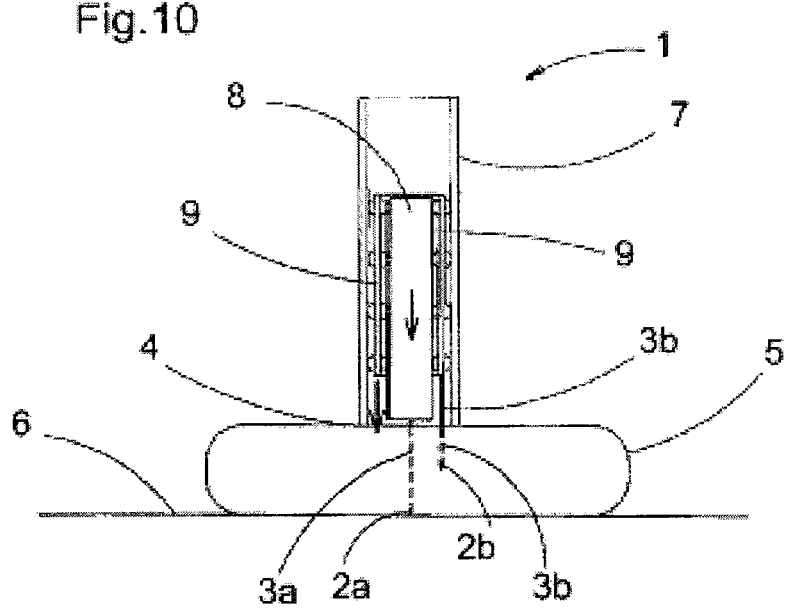

FOOD COOKING CONTROL METHOD AND DEVICE

This application is a U.S. National Phase Application of PCT International Application No. PCT/ES2008/000037, filed Jan. 24, 2008.

FIELD OF THE ART

The present invention relates to a food cooking control method and device. The invention is particularly applicable to a food cooking process on a surface such as a griddle during which the food will be turned several times. The proposed device can be associated to another piece of equipment or machine used to manage food finishing.

BACKGROUND OF THE INVENTION

Food cooking control devices are known the aim of which is to facilitate and standardize food preparation without needing to have specialized labor. These devices consist of elements equipped with cannulas or rods provided with temperature detectors which are inserted into the food to be controlled. The element is usually connected to means for processing the information received from the detectors, such that food cooking is controlled according to certain parameters.

The different devices have a common element, all of them are inserted into the food but lack means for determining the exact position of the device inside the food. Since the exact position of the temperature sensors inside the food is not known, it is not possible for them to control the energy accumulated in the temperature gradient occurring between the outer area of the food through which it receives heat and the center of the food while it is cooked. Nevertheless this energy accumulated in the gradient between the inside and the outside will appear when the cooking ends and the supply of energy maintaining the gradient ceases. The energy accumulated in the gradient will diffuse until equilibrium is reached and the temperature in the entire piece becomes equal.

Additionally, there is another issue which the different devices do not tackle either, during cooking processes, foods change in dimensions during the process, increasing them in some cases and reducing them in others such that the center of the raw food is not the same point as the its center throughout the cooking process.

U.S. Pat. No. 6,753,027 describes a method for controlling the cooking process and a detector for carrying out said method. By means of said method at least two temperature values are obtained by means of a detector adapted to be at least partially stuck into the food to be cooked. Said temperature values are obtained at several points in random positions inside the food at different depths, the separation distances between the detection points being fixed and known, and at least at another point outside the food determining the temperature of the environment.

Based on these values, an extrapolation is done and food core temperature is calculated in combination with the temperature taken outside the food to control the cooking thereof.

The drawback of the described method is that the temperature detector is stuck in a different way inside the food every time it is used, such that the points at which the temperature is measured are different for each use. Although the separation distance between the different detection points is known, it is not possible to know the relative position thereof inside the food. This makes it impossible to position the detection points in the most interesting precise zones to control the food temperature. Thus, if the size of the foods to be controlled is different, the temperature taking points are positioned in a substantially different manner in relation to the thickness of each food, which makes the data obtained useless. This drawback is more obvious in foods which are semi-submersed in liquids, or in foods receiving heat through only one side.

Therefore, the described method does not allow applying uniform cooking parameters giving the same result for all the foods in which it is used, since the temperature values taken for a food correspond to zones different from those controlled in another food.

Patent DE-A-4032949 describes a device proposing the use of two temperature sensors, one for being positioned on the surface of the food and the other one inside such food which can be stuck at greater or lesser depth into the food but without precision or control.

European patent EP 1473554 describes a utensil and a method for controlling a cooking device. This utensil consists of a temperature measurement device with two temperature detectors. One of said detectors is at one end of the utensil in contact with the bottom of a cooking receptacle, and the other device is positioned at a certain distance from said end.

This utensil allows controlling the temperature of the cooking receptacle and of the cooked food. Nevertheless, the described utensil has the drawback that it only allows controlling points positioned at fixed and determined distances from the food. If the size of the different foods changes, or the utensil is placed differently, the detectors of the utensil are positioned at different points or even outside the food. Furthermore, it must be added that most foods change in shape and/or geometry during the cooking process, which makes their use be limited to controlling the cooking of regular liquids or foods with constant thickness and which do not change in geometry during the cooking process.

Furthermore, the temperature detector in contact with the bottom of the receptacle may not be very useful, since the heat supplied to the food is transmitted in a different manner according to the characteristics of the food to be controlled and the heat source.

In the case of griddles, which can have different shapes (flat, grooved) and supply heat by means of different sources (charcoal, infrared, air), the information provided by this contact detector is not relevant. This is due to the fact that the amount of heat absorbed by the food is different from the amount of heat absorbed by the detector. Heat acts in a different manner on the food according to the characteristics of the source and the food itself.

U.S. Pat. No. 4,441,693 relates to a method for controlling the cooking process of a food in an oven comprising the steps of determining the power absorbed in said food during cooking, and determining the average food temperature using the absorbed power derivative and cooking parameters according to the equation:

$$Ta = To + a1[(Pa)t/M] + a2[(Pa)t/M]^2 + a3[(Pa)t/M]^3$$

where,
Ta is the average food temperature,
To is the initial food temperature,
Pa is the power absorbed in the food,
t is the food cooking time,
M is the initial food mass, and
a1, a2, a3 are coefficients relating to the food weight loss and are experimentally determined for several food categories and amounts.

In addition, patent EP 1688721B1 describes a method for determining the turn-over time of a food. Said method only refers to the first turn-over of the food and calculates the time in which it is carried out according to the different between the final temperature and the initial temperature of the food.

Patent EP-B1-1688721 describes a method and a device for determining the turn-over time of a product to be cooked, with a series of steps in which an initial food temperature and another final temperature are started from and temperatures inside the food are gradually acquired with a member which can be inserted in the food provided with a probe, such as the one described above and with the same deficiencies. According to this method, the food is turned over when the temperature in the probe reaches a fraction of the desired total temperature. The method has the drawback of the imprecision of the temperature taking zone and of ignoring the thermal inertia, or heat gradient explained.

Patent DE-A-19609116 describes a food cooking method, particularly for cooking large pieces of meat, which states that the core temperature is measured several times successively during the cooking. However, this document does not teach how to position a temperature probe in a precise manner inside the food.

DESCRIPTION OF THE INVENTION

The two patents, U.S. Pat. No. 4,441,693 and EP 1688721 B1, neither teach nor suggest how to place the temperature probe inside the food. Furthermore, they do not take into account the heat gradients and the inertias occurring in the food throughout the cooking process either.

Neither EP-B1-1688721 nor DE-A-19609116 teach or suggest how to place the temperature probe inside the food in a precise position, in relation to the thickness, and in a repetitive manner. Furthermore, they do not generally take into account the heat gradients and the inertias occurring in the food throughout the cooking process, therefore the control of said process is mostly ineffective.

In a first aspect, the present invention relates to a food cooking control method comprising the insertion inside a food, for example a piece of meat or fish, supported on a reference surface or cooking surface (e.g. a griddle), of one or more temperature detection devices.

A basic version of the proposed method comprises:

defining a desired equilibrium food temperature once the food mass is cooked;

positioning said temperature detection device or probe, which is at least one in number, by means of the aid of positioning means, inside said food in a detection zone to a pre-determined insertion depth in relation to the thickness of the food (i.e., in a well defined zone of the food) in relation to the absolute thickness of the food) so that a detected temperature TC can be obtained at all times during cooking in said pre-determined zone; and processing the data of said temperature TC obtained by means of at least said temperature detection device during cooking.

Said pre-determined zone of the food is generally a middle or central zone in relation to the total or absolute thickness of the food.

The method further proposes, by means of the aid of positioning means which allow positioning probes on the surface or at exact known depths inside the food with respect to it limits, determining and processing the temperature of the surface through which the food receives heat or a temperature close to the cooking surface detected TP.

The method is thus implemented with a joint processing of said temperature TP and temperature TC in addition to a permanent evaluation of the variation of said temperature TC to the first derivative level. An evaluation of the variation of the first derivative of said temperature TC is also generally proposed.

The method of the present invention further comprises:

defining a number of times the food to be cooked must be turned to reach said final desired cooking temperature by means of several cooking steps;

generating a signal to indicate that it is necessary to turn over said food on said cooking surface after each cooking step;

means for maintaining the probes in the relative position inside the food during the entire process and means for positioning said detection device after each turn with said positioning means in a pre-determined position again, for example a central or middle zone, with respect to the absolute thickness of the food (in other words, repositioning it); and determining the time of each turn-over according to:
said temperature TC of the detection device at the time prior to each turn-over,
the evolution of the temperature of said detection zone, determined by said processing including at least said first derivative of the temperature TC, and
the temperature gradient between the zone of the outside of the food in contact with the cooking surface and said detection zone, inside the food.

For a preferred embodiment, said desired equilibrium food temperature is an equilibrium temperature in said middle or central zone, which is the target upon ending the cooking and taking into account a subsequent food transfer on a known mass consumption surface and at a given temperature.

The temperature at the end of at least one cooking step, or calculated central temperature TCC, is determined by means of the following expression $$TCC = TC + (TP - TC) \times F + D1 + D2$$

wherein:

TC=central temperature measured at all times;

TP=temperature close to the cooking surface;

F=factor depending on physical characteristics of the food (mainly on thickness, water content and direction of its fibers), and the type of food;

D1=correction factor depending on the value of the first derivative of TC;

D2=correction factor depending on the value of the variation of the first derivative of TC or second derivative;

Factor F furthermore depends on the interrelation between the derivative of the temperature TC or slope PC and the derivative of the temperature TP or slope PP, such that when the relation between TP and TC reaches certain values, the coefficient F changes. Said variation is mainly due to factors which alter the energy absorbed by the food, such as the mass loss and the evaporation of the water from the surface of the food, as well as to the internal transmission of heat due to the water which is retained between the fibers and moved by capillarity, transmitting the heat inside the food, substantially modifying the heat transmission inside the food.

For one embodiment, the method comprises the insertion in the food of at least two of said temperature detection devices by means of the aid of said positioning means, to an absolute pre-determined distance with respect to said reference surface and controlling the temperature and evolution of temperature of each of said detection devices, one of which provides the aforementioned temperature TC.

The method likewise comprises the detection of the temperature of said cooking surface of the food and/or the detection of the room temperature and/or the detection of the temperature close to a zone of the food by means of at least one temperature detection device.

The method is implemented in practice by means of the control of a food cooking device according to the processed data, at least in relation to temperature, and to pre-determined cooking parameters.

For one embodiment, said cooking surface is obtained by applying a heat source placed under said food, such as a hot plate, on which the food directly rests.

In one embodiment, the method comprises analyzing with a certain frequency the data or readings from said temperature detection devices to know the detected central temperature TC of the food over time, and comparing said values of the detected central temperature TC with the value of a target central temperature TCO, predefined by the user depending on the cooking point required for the food, controlling said heat source according to the result of said comparisons.

The method of the present invention also comprises measuring the elapsed time between said application of said heat source under the food and the time at which said signal has been generated and once said food has been turned over, maintaining the application of said heat source under the food during an application time depending on said measured time.

For one embodiment, the method comprises controlling said heat source to apply a different heating power during the measured time before turning the food over and during the application time once the food has been turned over. Said heat source is controlled by means of a series of predefined successive increments of the heating power taking into account an initial central temperature TCI of the food.

The method also comprises analyzing the variation of said values of the detected central temperature TC over time to establish:

that said evolution is or is not coherent according to the difference of values between every second one of said readings, and if the central temperature TC is increasing or decreasing according to the sign of the difference between successive values.

In the event that it is established that the evolution of the values of the detected central temperature TC is not coherent, the method comprises considering the results of said comparisons of the detected central temperature TC with the target central temperature TCO as invalid until it is established that the evolution is coherent.

The method likewise comprises calculating a function of the calculated target central temperature TCCO of the food defined as the target central temperature TCO plus a safety factor due to the heat loss experienced in the food when it is removed from the heat source and placed on a surface at a lower temperature. In the event that the surface on which the food is placed is at temperature TCO, then TCCO and TCO would coincide.

In another aspect of the invention, the method proposes determining for a given food a function reflecting the optimal heat absorption coefficients $P_{optimal}$ for each detected temperature close to the cooking surface TP. Tolerance ranges for the maximum and minimum absorption coefficients are fixed for each temperature based on these optimal functions.

These functions have two characteristics:
1. they are exponential equations,
2. for a temperature value TP of 100° C., the value of the optimal heat absorption coefficient $P_{optimal}$ is equal or close to zero.

The functions mark the maximum and minimum heat absorption coefficients the food can have for each temperature of the cooking process, i.e., how many degrees centigrade the surface of the food can increase per second.

These functions are compared with the derivatives PP of the temperature close to the cooking surface TP obtained from the readings provided at all times of the cooking by the griddle probe.

The mentioned functions are conditioned by the characteristics of the cooking element, the heat transmission capacity, its heating power and its thermal inertia on one hand and by the characteristics of the food on the other.

With these functions, a cooking model is achieved for a certain standard food upon determining the temperature and the evolution thereof in the zone through which it receives heat. The following is therefore determined:
1. the gradient between the inside and the outside of the food,
2. the cooking time on each side, thus obtaining a uniform result.
3. how much time a food must be exposed to a certain temperature, thus defining the outer finish.

According to the previous description, the calculated heat absorption coefficient function of the food with respect to time is at least one slope function PP obtained as a result of the evolution of the values of the detected temperature close to the cooking surface TP over time. For another embodiment, said calculated heat absorption coefficient function of the food with respect to the time is an average function PPM of said slope function PP obtained as a result of the evolution of the values of the detected temperature close to the cooking surface TP over time.

When the average function PPM deviates considerably and continuously from said predefined heat absorption coefficient function $P_{optimal}$, the system detects that it is necessary to increase or reduce the heat energy supply.

The system thus compares during the entire cooking time the average function PPM to the optimal heat absorption coefficient $P_{optimal}$. Therefore, in the event that the average function PPM is greater than the maximum heat absorption coefficient for a certain number of readings, the system sends a signal so that the heating power is reduced, since the temperature increment that is occurring exceeds what is necessary. In addition, when the average function PPM is less than the minimum heat absorption coefficient, the system at first sends a probe repositioning signal, since foods deform during the cooking process and it is necessary to reposition the probe in the pre-determined point close to the griddle. If after repositioning the average function PPM continues to be greater than said maximum heat absorption coefficient function, the system sends a signal so that the heating power is increased, since the temperature increment that is occurring is less than what is necessary.

In addition, if it is established that the evolution of the values of the detected central temperature TC are not coherent and those of the temperature TP (whether or not they are coherent) are, in a consecutive and increasing number of said values, greater than value of the target central temperature TCO and it is detected that the food has been turned over, the method comprises indicating that the food is cooked.

If it is established that the evolution of the values of the detected central temperature TC is coherent and that the evolution of said slope function PC is negative, but that the result of the function of said calculated central temperature TCC is greater than the value of the calculated target central temperature TCCO for a consecutive number of readings, the method comprises indicating that the food is cooked.

If the detected central temperature TC reaches the value of the target central temperature TCO and the evolution of said slope function PC is positive or equal to zero for a consecutive number of prior readings and a consecutive number of readings after the time at which both temperatures TC, TCO coincide, the method comprises indicating that the food is cooked.

In a second aspect the present invention relates to a food cooking control device, comprising at least one adapted detection device intended to be inserted in the food.

The device further comprises means for determining the thickness of the food and positioning means for positioning said detection device inside said food to a pre-determined insertion depth in relation to the thickness of the food. In other words, if for example the user wishes to insert said detector device transversely into the food at a 50% depth, once the thickness of the food is determined the positioning means will position the detector device at the depth coinciding with 50% of said determined thickness, regardless of the absolute value of said thickness. In a preferred embodiment, the positioning means comprise cannulas which are inserted transversely into the food, and in which the detection devices are assembled.

For one embodiment the device includes two of said detection devices, the positioning means being adapted to position one of said detection devices at an absolute pre-determined distance with respect to a reference surface on which the food is supported or the upper movable stop or both, said pre-determined distance preferably being between 0.5 and 30 mm, and more preferably between 1 and 10 mm.

In relation to said means for determining the thickness of the food, for one embodiment these means comprise a reference element to be supported by an end on said reference surface on which the food is supported and a stop movable with respect to said reference element to be supported on the surface of the food opposite to the reference surface, the thickness of the food being determined by the distance between said stop supported on the surface of the food and the end of said reference element.

For another embodiment, the means for determining the thickness of the food comprise an electronic measuring apparatus with a detector device suitable for detecting said thickness without contact with the food, said detector device comprising at least an emitter and a receiver of, for example, microwaves or of ultrasounds, the positioning means being adapted to individually position each detection device inside the food according to the thickness of the food detected by the electronic measuring apparatus.

For a preferred embodiment, the detection devices are temperature detection devices, although for other embodiments the detection devices are devices of the group comprising: temperature detection devices, detection devices for detecting moisture, electric conductivity, distance and pH, or a combination thereof.

As a result of the fact that the device of the invention allows changing the distance between the detection device, or probe, which is positioned at a fixed distance from the reference surface and each of the remaining detector devices, each detector device can be positioned at the most interesting points throughout the thickness of the food to control the temperature thereof when the detector devices are temperature detectors or probes.

For the purpose of complementing the detections made by means of using the proposed device, the latter comprises for another embodiment a detection device for detecting the room temperature and/or a detection device for detecting the of the temperature of one or more surfaces of the food and/or a detection device for detecting the temperature of the reference surface when it is a cooking surface, such as an infrared temperature probe which allows measuring either the temperature of the surface of the food or of the cooking surface during the cooking process or before said process begins.

The device is communicated with an electronic system with processing means, in connection with said detection devices and/or said detection devices for detecting room temperature and/or the temperature of the surface of the food and/or said means for determining the thickness of the food, to at least process data received from said devices or means and/or to store records of said data.

Said electronic system comprises indicators, and is adapted to activate said indicators when the detected temperatures reach certain values and/or when said values are maintained for a certain time.

Even though the proposed device is applicable to cooking a food supported on a cooking surface to which a constant heating power or a heating power not controlled by the device is applied, for another more elaborate embodiment the use of the proposed device to control said heating power to be applied is contemplated, to which end said electronic system comprises means for control associated to said processing means, to control a cooking device for cooking the food according to the processed data and with pre-determined and/or programmable cooking parameters.

For another embodiment, the processing means comprise means for providing cooking instructions for cooking the food according to the processed data, so that for example a user can follow them appropriately to cook the food according to a cooking program.

For one embodiment, the device is autonomous, comprising the mentioned electronic system, and for another embodiment the device does not comprise the electronic system (or it comprises only one part), but rather is connected with said system, which (at least one part) forms part of said cooking device, such as a Clamshell griddle or a cooking tunnel, the device being able to be integrated inside said machines.

As a result of said means for processing the data collected by the detector devices, the device of the invention allows precisely controlling, even on a large scale, cooking food. The simpler designs of the device of the invention could consist of indicators associated to the detector devices which are activated when the cooking has reached the desired point, such as in the mentioned case of an autonomous device.

In more evolved designs, said means could consist of a desktop computer or laptop, an electronic agenda adapted to the device, etc. Programs adapted to each type of food or to each particular taste could be created. As a result of this configuration, cooking foods could be done completely autonomously since the device takes care of regulating the amount of heat supplied to each food and even the time at which it is turned off.

It is known that while cooking a food changes in shape and size, which could cause the detectors to lose their relative positions inside said food. To prevent such drawbacks, the positioning means of the proposed device are adapted to reposition them against changes in the thickness and/or shape of the food while cooking, maintaining the relative positions with respect to the new thickness and/or new shape of the food.

For the purpose of maintaining the relative positions of the detector devices against changes in the shape of the food, the positioning means comprise an anchor intended to be fixed to the surface or zone of the food closest to said support surface.

For the mentioned case in which the device comprises said stop to collaborate in determining the thickness of the food, the positioning means comprise a thrust device arranged to thrust, in the use position, said stop towards the food so that in the event that the food decreases in thickness or changes regarding the surface profile, the stop changes its position until coming in to contact with the surface of the food opposite to the reference surface, for the purpose of determining the new thickness of the food to reposition the detector devices.

For one embodiment, said thrust device is a spring, and for another embodiment, said thrust device is actuated by an electric motor.

Said thrust element is not necessary for the case in which the stop, or an element attached thereto, weighs enough so as to exert sufficient force against the food to reposition itself, and with it the detectors, when the food decreases in thickness.

For another embodiment, which can be applied for example to the mentioned case in which the means for determining the thickness comprise an electronic measuring apparatus, the positioning means comprise one electric motor for every detection device in order to deal with said changes in the thickness and/or shape of the food during cooking, thus maintaining the relative positions with respect to the new thickness and/or new shape of the food by means of the individualized movement of each detector.

For one embodiment, the positioning means are completely automatic, including the energy supply, not requiring the intervention of the user, such as would be the case for example in which the device is moved by a robotic arm.

In contrast, for another embodiment the positioning means require human intervention at least for an initial movement of the device until arranging them on the food and/or to move the detectors to inside the food.

When the detector devices are temperature probes, the interval of distances between them allows, by means of the probe located in the zone inside the food closest to a cooking surface, tracking the heat absorbed by the food and immediately knowing if the food is burning, since this zone is the one receiving the most heat. At the same time, the probe is separated from said cooking surface such that distortions that would be generated if the probe was in direct contact with said surface are avoided. For practical purposes, it is much more useful to know the temperature in the inner zone of the food closest to the heat source than that of the value of the applied temperature, since the heat can be transmitted very differently depending on the characteristics of the food.

The ends of the cannulas with a pointed shape facilitate the insertion thereof in the food. In the event that the cannula is supported on the cooking surface, the pointed shape also prevents the heat transmission towards the probe from being more than desired.

Although, as previously mentioned, the reference surface is preferably a cooking surface on which the food is supported, the surface could be any fixed point outside with respect to which one of the detector devices could be positioned inside the food.

The device of the invention is especially useful for any type of foods cooked on a griddle or grill, which are usually the most difficult foods to control.

BRIEF DESCRIPTION OF THE DRAWINGS

For the purpose of facilitating the description provided above, drawings are attached in which a practical embodiment of the invention has been schematically depicted in a non-limiting exemplary manner, in which:

FIGS. 1 to 4 are schematic views of an embodiment of the device of the present invention, showing the operation thereof;

FIGS. 5 to 8 are views of the device of FIGS. 1 to 4, showing its use in foods having different thicknesses;

FIGS. 9 and 10 are views of another embodiment of the device of the invention.

DESCRIPTION OF A PREFERRED EMBODIMENT

Figure 11:
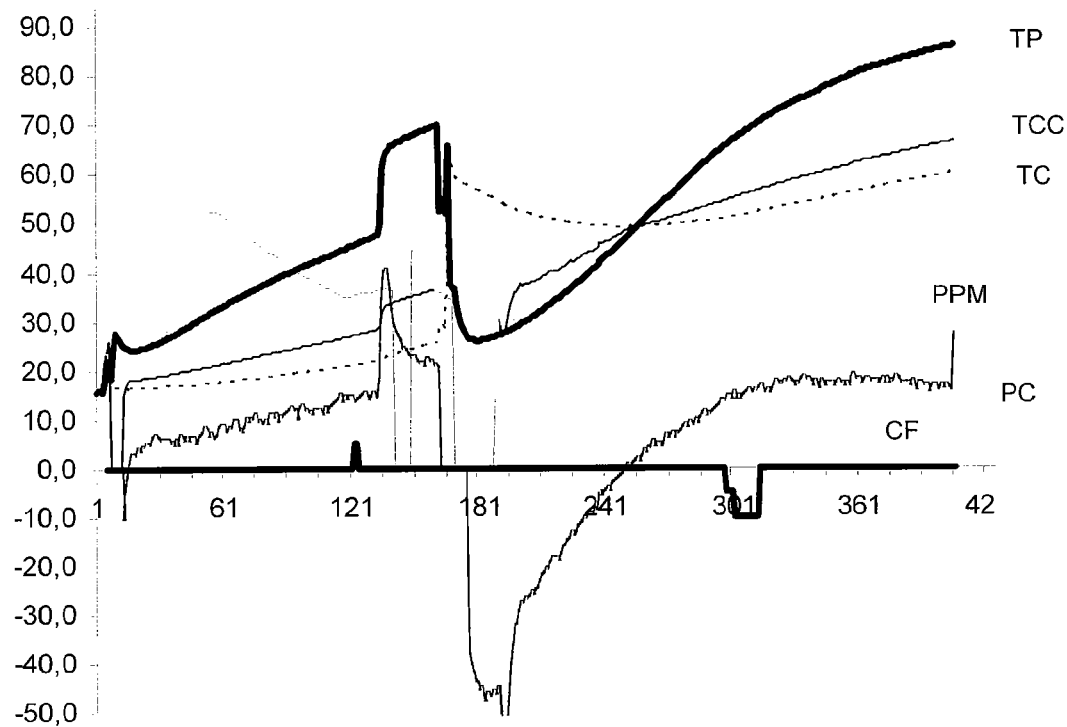
FIGS. 11 to 14 are graphs illustrating different examples of cooking of foods in which the evolution of the different parameters involved in said cooking process is shown.

In reference to the schematic embodiment depicted in FIGS. 1 to 4, the device 1 of the invention preferably consists of a plurality of detection devices, preferably temperature detection devices or probes 2a, 2b, 2c which are assembled in parallel cannulas 3a, 3b, 3c. These probes 2a, 2b, 2c are connected to means for processing the data received therefrom, which will be described below.

The cannulas 3a, 3b, 3c are intended to be inserted transversely by sticking them inside food for the purpose of controlling the cooking thereof. The minimum number of probes 2a, 2b, 2c for the device to work is one, but their number may vary according to needs; in the depicted embodiment, the device 1 comprises 3 probes. The cannulas 3a, 3b, 3c can be moved longitudinally with respect to a stop 4, the function of which will also be explained below.

The cannulas 3a, 3b, 3c are associated to the stop 4 by means of a transmission mechanism (not shown) which allows changing the distance between the stop 4 and the probes 2a, 2b, 2c of each cannula 3a, 3b, 3c proportionally. This mechanism, which can be any mechanism which allows changing the relation between the movement of each of the cannulas 3a, 3b, 3c, such as for example a gear or pulleys, allows the movement of each of the cannulas 3a, 3b, 3c to be proportional to that of the others. A device 1 (FIGS. 2 and 3) can thus be provided which allows extending the free end of the cannula 3a to a desired distance A from the stop 4, the free end of the intermediate cannula 3b being positioned at half the distance A reached by the first cannula 3a, and the end of the third cannula 3c remaining in its initial position. The probes 2a, 2b, 2c are also positioned in the desired position. Another embodiment of the mechanism of the device 1 could also allow the positioning of the probes 2a, 2b, 2c shown in FIG. 4. To that end, it is only necessary to change the gear ratio between the cannulas 3a, 3b, 3c and the stop 4 to achieve the desired relative positioning of each probe 2a, 2b, 2c.

As can be observed, the probes 2a, 2b, 2c are always positioned in the same relative position, regardless of how extended the cannulas 3a, 3b, 3c are.

FIGS. 5 to 8 show the use of the device 1 for controlling the cooking of foods of the present invention.

The device 1 is positioned on food 5 (FIG. 5), which in this case is supported on a cooking surface 6, for example a griddle or a skillet. As can be observed, the stop 4 is supported on the upper surface of the food 5, then the cannulas 3a, 3b, 3c are extended and inserted in the food until the free end of the cannula 3a, which is extended farthest, is supported on the cooking surface 6. The thickness of the food 5 is thus determined by the distance between the stop 4 and the end of the cannula 3a which is supported on the cooking surface 6.

In this case, the transmission mechanism of the device 1 is configured so that the free end of the intermediate cannula 3b is positioned at half the distance reached by the first cannula 3a, and so that the end of the third cannula 3c is positioned in its initial position, as has been described in the embodiment of FIGS. 2 and 3. Upon moving the cannulas 3a, 3b, 3c, the device 1 positions the probes 2a, 2b, 2c in the same relative position for any thickness of the food 5, as can be observed in the food 5 of FIGS. 5 and 6 and in the food 5 of FIGS. 7 and 8. The probe 2a is thus always positioned at a small distance from the cooking surface 6, the probe 2b is always substantially positioned at a middle point of the thickness of the food 5, and the probe 2c is always positioned at a point close to the upper surface of the food 5.

For an embodiment which is not shown, the anchor described in the section of description of the invention is arranged at the end of the cannula 3a traversing the food 5 and preferably comprises a sensor suitable for detecting the contact of the anchor with the support surface 6.

As has been mentioned above, the transmission mechanism of the device 1 may be configured so that each probe is positioned inside the food in the situation of most interest.

The probes 2a, 2b, 2c could also be positioned in the food 5 by extending 5 the cannulas 3a, 3b, 3c before sticking them into the food 5. The cannulas 3a, 3b, 3c are then inserted into the food 5 until the cannula 3a is supported against the cooking surface 6. Once this has been done, the stop 4 is moved downwards maintaining the cannula 3a in contact with the surface 6, until the stop 4 is supported on the surface of the food 5, and the remaining cannulas 3b, 3c are positioned in the same way as has been described above.

Once the probes 2a, 2b, 2c are placed in their definitive position (FIGS. 6 and 8), the cooking of the food 5 is controlled.

The probe 2a positioned in the cannula 3a is separated from the cooking surface 6 at a pre-determined distance which will preferably be comprised between 0.5 and 30 mm, and more preferably between 1 and 10 mm. The value of this separation distance will change depending on the thickness of the food 5 and prevents the probe 2a, which is the one closest to the cooking surface, from directly receiving the heat of the cooking surface 6, which could distort the collected information.

The cannulas 3a, 3b, 3c preferably end in a point, particularly the cannula 3a, since the heat transmission from the cooking surface 6 to the probe 2a is substantially reduced. Furthermore, the pointed shape facilitates the insertion of the cannulas 3a, 3b, 3c into the food 5. The probe 2a is positioned in the zone of the food 5 closest to the heat source, such that the evolution of the cooking of the food in the zone which can be burnt first is known at all times.

The remaining probes 2b, 2c are arranged in the embodiment shown at the middle point of the thickness of the food 5 and next to the upper surface of the food 5, respectively. The cooking of the food 5 is thus controlled 5 at three points throughout the thickness thereof.

The probe 2a closest to the cooking surface 6, which is the most important one, allows knowing the amount of heat absorbed and the temperature reached by the food 5 in the zone closest to the heat source. As a result, the appearance of the outer finishing of the food can be controlled. Likewise, it can be foreseen in advance, by comparing it with the optimal function, if the amount of heat received by the food is correct, being able to control the heat source before the food is burnt.

The probe 2b allows knowing the temperature in the food core, such that it can be controlled at which cooking point the food is located at a certain time, and in combination with the probe 2a, how the heat is transmitted inside the food.

Finally, the probe 2c provides relevant information about heat transmission to the zone farthest from the cooking surface, and it is especially useful in foods which must be turned over or which are cooked in an oven or submersed in a liquid.

The differences in temperatures between the different temperature taking points provide relevant information about the energy gradients between the different points of the food.

Although in the described embodiment, the device 1 of the invention comprises three probes 2a, 2b, 2c, the device 1 could operate with a minimum of one probe, although preferably with two probes. One of the probes 2a is always positioned at a small distance from a reference surface 6, next to the zone of the food 5 receiving the heat, and allows controlling the heat received by the food 5. The remaining probes may be positioned in the most suitable position inside the food 5 depending on its characteristics (thickness, type of product, homogeneity of the product, etc.) to control the cooking in each zone of the food 5.

This also allows, by means of the device 1 of the invention, obtaining different cooking degrees for each zone of the food 5, for example, a piece of meat well done on the outside and rare on the inside.

The need to provide several probes is also given by the fact that it is possible for the food to not have a constant thermal conductivity coefficient, therefore it is necessary to control the food temperature at certain points of such food to be able to achieve a precise cooking in each of the zones of the food 5.

The amount of heat absorbed by the food, the heat that it transmits, and how it transmits it is known by combining the information of the temperatures reached in each zone of the food 5 with the elapsed time, whereby the cooking characteristics of the food and its evolution at all times can be precisely known.

In the event that the cooking of a food with several thicknesses must be controlled, several devices for each of said thickness may be used.

To improve the cooking of the food, the device 1 of the invention may also include a probe to control the temperature supplied by the heat source of the cooking device for cooking the food. As a result of this probe, the amount of heat supplied may be regulated according to the temperature reached in the zones of the food in which the other probes are positioned and to the elapsed time. The device 1 thus allows a completely automatic control of the cooking of the food. Furthermore, the temperature of a cooking surface can be known before placing the food, to set it to the optimal level.

This probe may form part of the device of the invention, or it can be integrated in the cooking device for cooking the food or in the cooking surface, for example in a frying pan or griddle.

Although in the embodiment shown, the cannulas 3a, 3b, 3c are arranged next to one another to more clearly show the operation of the device 1 of the invention, the probes 2a, 2b, 2c will preferably be aligned with respect to one and the same longitudinal axis to improve the cooking control and the positioning thereof inside the food 5.

FIGS. 9 and 10 show a possible embodiment of the device 1 of the invention, in which an embodiment of the transmission mechanism used to position the probes can be seen.

The device 1 comprises a hollow guide 7 inside which a carriage 8 moves longitudinally by means of ball bearings 9 arranged between the inner walls of the guide 7 and said carriage 8. In other embodiments, instead of bearings 9, racks and pinions, for example, could be used.

As a result of the described configuration, the movement speed of the bearings 9 with respect to the guide 7 is half the movement speed of the carriage 8. This is possible as a result of the fact that the distance of the carriage 8 to the support point of the balls of the bearing 9 in the guide 7 is twice the distance of the center of the balls of the bearing 9 to said support point.

It is thus achieved that, by associating a cannula 2a to the carriage 8, and another cannula 2b to the bearing 9, the cannula 2b associated to the bearing 9 always covers half the distance that the cannula 2a associated to the carriage 8 does.

Therefore, the probe 2b of the cannula 2b will always be positioned at half the distance from the stop 4 of the device 1 than the probe 2b of the cannula 2b.

In this embodiment, the cannulas 2a, 2b have also been shown unaligned to more clearly show the operation of the device, although they will preferably be aligned. As can be observed, a high compactness of the device 1 and a reduced size are achieved by means of the present embodiment.

Other mechanisms for positioning the probes could consist of a gear, pulleys, articulated levers or any other gearing mechanism known in the state of the art.

The device of the invention could also comprise non-mechanical means for determining the thickness of the food and for positioning the probes therein.

These means could consist of an electronic apparatus calculating the thickness of the food, for example by means of an ultrasound device, and positioning each probe automatically inside the food according to the detected thickness.

As has been explained above, the probes of the device 1 are connected to means for processing the data received therefrom. These processing means may also process the data of the thickness of the food.

With the inclusion of a probe or electronic apparatus measuring the temperature of the surface or of the cooking space of the food, the heat supplied to the food can also be controlled according to its state.

In its simplest form, these means may consist of indicators activating a signal when the desired temperature has been reached at each point to be controlled. For example, the indicators could consist of LED diodes which are turned on when a thermostat calibrated for a pre-determined temperature is activated. This temperature may change depending on the cooking degree that the food needs or on the preferences of the user.

Lights or indicators indicating the evolution of the cooking, or an acoustic signal warning when the cooking of the food has ended according to the temperature and to the time could also be used. Likewise, an indicator indicating when the food which is being cooked in a griddle or the like must be turned could be included.

Another type of more developed device for processing the data of the probes may consist of a portable electronic device or computer capable of processing cooking programs for each type of food. In this case, there is a large number of control possibilities, since the number of variables to be controlled (temperature of the probes, thickness, time, cooking degree, etc.) can be considerably increased. Information could even be transmitted by wires, in a wireless manner or by means of any other system to an external unit processing the obtained information to decide when the product can enter the heat source, when it must exit, when it must be turned, or any operation required by the food during its preparation.

For example, cooking programs adapted to each type of food or to prepare foods with certain cooking degrees could be provided. By means of said programs, the cooking time and the cooking device for cooking the food may be controlled, and instructions could even be supplied to the user which allow him or her to prepare the food in the desired manner (seasoning, turn-over of the food, etc.).

As can be deduced from that described above, the device of the invention allows precisely controlling the cooking of foods regardless of their thickness, size or shape, and it can be applied for domestic use or for industrial use.

The use of the device of the invention is especially advantageous in the industry or in the preparation of foods in large amounts since it allows a uniformization and standardization of the cooking of all the pieces, regardless of the variations in their shape or in their thickness and in a completely automatic manner.

The thickness of the food will be understood in the present description as the dimension of the food in a certain direction. This dimension will normally correspond to the separation distance between a cooking surface and the upper surface of the food which is supported thereon according to a direction substantially perpendicular to said cooking surface.

Nevertheless, said distance may also correspond to any section through a food which is cooked in an oven, or cooked in water or in any liquid medium.

Likewise, although the reference surface will normally be a fixed cooking surface 6 on which the food 5 is supported, the reference surface may also consist, for example, of a spatula or tray which is temporarily placed under the food when the cooking surface is a grill or similar element.

Said reference surface may also consist of any element outside the food which is useful for positioning one of the probes inside the food, such that such probe is useful as a reference for positioning the remaining probes.

In addition, the pre-determined separation distance between the reference surface and one of the probes will also be understood in the present description as the separation distance between both elements according to a direction substantially perpendicular to the plane of the reference surface.

FIGS. 11 to 14 are different embodiments of the cooking of elements in which the values shown in the graphs are measurements of temperatures or derivatives of temperatures with respect to time in seconds.

Thus, FIG. 11 shows the cooking process for cooking a 2 cm thick piece of veal steak in which a first turn-over thereof is carried out at about second 160. As can be observed in the graph, upon carrying out said first turn-over the temperature TC increases considerably, a fact which is not shown by the reality of the evolution of the cooking of the food 5. In order to see what the supplied energy degree is or at what time of the cooking the food 5 is in at this time, not only the temperature TC would have to be taken into account, but also the temperature gradient between the detected temperature in a zone close to the cooking surface TP and the temperature at the center TC. In fact, at the time of the turn-over, the food has received half the energy necessary for the cooking and this is not shown by the readings of the temperature at the center, since the latter have not increased by 50% of the target. This temperature gradient is shown upon carrying out the turn-over, in which the liquids which were at the lower zone of the food move by gravity to the other side, such that the readings of the temperature TC by themselves do not really show the situation of the cooking.

Upon turning over the food 5, the derivative PC of the temperature TC decreases, since it obtained most of the heat reaching the center of the food 5 from the fluids coming from the upper part, and the heat which it receives from the lower part has still not reached the center of the food 5. At this point, in order to know the actual temperature of the center of the food 5, both the temperature gradient between the center and the griddle, which is negative, and the derivatives PC of the temperature at the center TC must be taken into account. The actual equilibrium temperature if the cooking ended at that time can be known by applying these corrections.

This example clearly shows the fact that if only the temperature at the center TC were considered, fixing a target for it and ending the cooking process once said target temperature TC has been reached, the data which could be obtained would not be reliable.

With reference now (in the same FIG. 11) to the calculated heat absorption coefficient function of the food with respect to time or average function PPM of a slope function PP obtained as a result of the evolution of the values of the detected temperature close to the cooking surface TP over time, it falls in a pronounced manner at the time of the turn-over due to a repositioning of the probe occurring when the food is turned. These changes are shown in the indicated equation describing the phenomenon, by means of the TCC.

Figure 12:
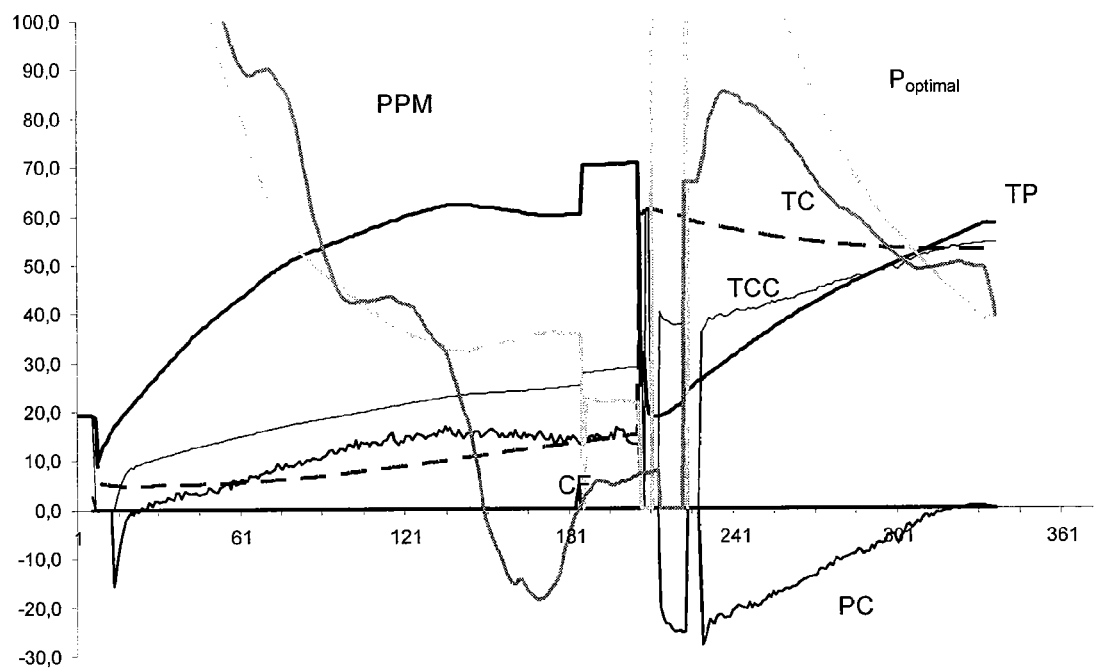

With regard to FIG. 12, it shows the cooking process for cooking a 2 cm thick ox steak, in which the phenomena mentioned in FIG. 11 are observed upon carrying out a first turn-over of the food. In FIG. 12 the situation of FIG. 11 is again repeated, with the same case, since it a steak cooked with 2 turns. The difference between FIG. 11 and FIG. 12 is that in FIG. 11 the cooking time of the second turn-over is longer than that of the first turn-over and in FIG. 12, on the contrary, the cooking time of the first turn-over is longer than of the second turn-over.

In both there is a common coincidence if only the TC were taken into account by fixing the exit target temperature, at the start of the second turn-over, the cooking process would end.

In addition, FIG. 12 also shows a function illustrating the evolution of the pre-defined or standard heat absorption $P_{optimal}$. When the average function PPM deviates considerably from said pre-defined heat absorption coefficient function $P_{optimal}$, which has a minimum and a maximum not shown in the mentioned graph, the system detects that the heating power must be raised or lowered. Thus, in the event that the average function PPM is greater than the maximum of the pre-defined function $P_{optimal}$, the system sends a signal so that the heating power is reduced, since the temperature increment which is occurring exceeds what is necessary. In addition, when the average function PPM is less than the pre-defined heat absorption coefficient function $P_{optimal}$, the system at first sends a probe repositioning signal, since foods deform during the cooking process and it is necessary to reposition the probe in the geometric center of the food. If after the repositioning the average function PPM is still less than the pre-defined heat absorption coefficient function $P_{optimal}$, the system sends a signal so that the heating power is increased, since the temperature increment that is occurring is less than what is necessary. In said FIG. 12 it can be observed that when the system detects that the average function PPM is less than the pre-defined heat absorption coefficient $P_{optimal}$, due to a deformation of the food, the probe is repositioned at about second 181, depicted by heat source control line CF. Said heat source control line CF gives the instructions to adjust the cooking to the pre-established model and the average function PPM has been compared with the $P_{optimal}$, therefore it is an indication of the deviation between both.

Figure 13:
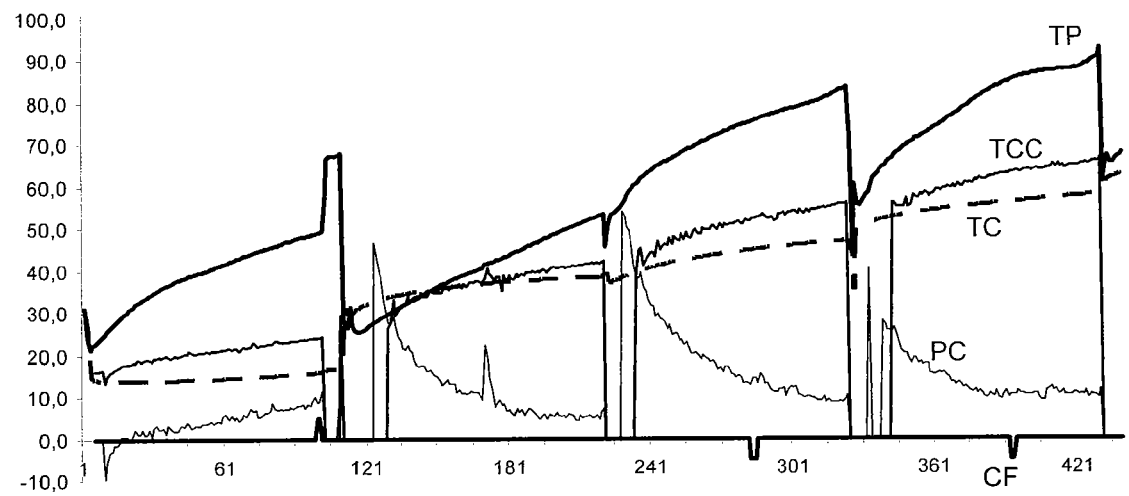

With regard to FIG. 13, it shows the cooking process for cooking a piece of steak of about 4 cm cooked with four turns. In said figure it is observed that although these jumps occur in all the turn-overs, they are greater the greater the temperature gradients between the griddle temperature and the temperature of the center.

Figure 14:
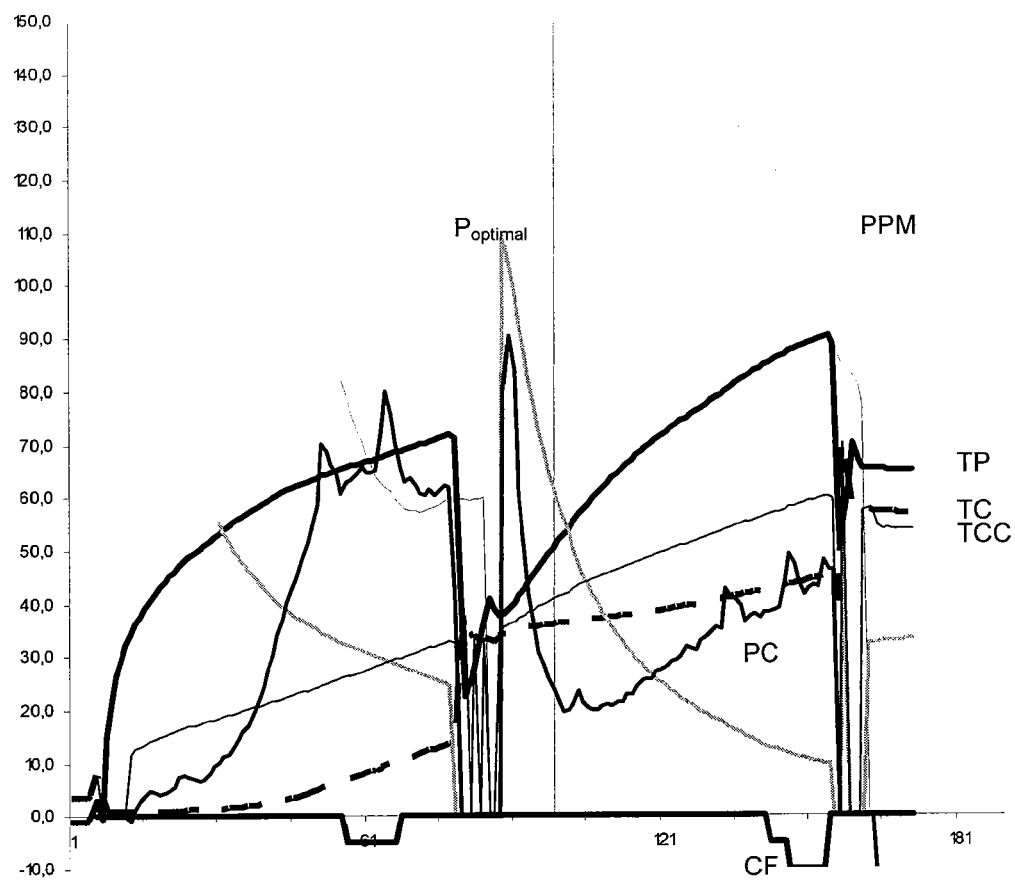

FIG. 14 shows the cooking process for cooking a piece of tuna which, like FIG. 12, also depicts a function illustrating the evolution of the pre-defined or standard heat absorption $P_{optimal}$. Said FIG. 14 shows in the x-axis line two reductions of heating power depicted by the heating power or heat source control line CF.

In one aspect of the present invention the food receives heat energy through a surface on which it is supported.

In a preferred embodiment, the desired equilibrium food temperature, used to control the cooking process, is an equilibrium temperature in said middle or central zone, which is the target upon ending the cooking and taking into account a subsequent food transfer on a known mass consumption surface and at a given temperature.

Factors D1 and D2 (described herein) will be nil when the value of the first and/or second derivative is equal to or greater than zero.

A person skilled in the art could introduce changes and modifications in the described embodiments without departing from the scope of the invention as it is defined in the attached claims.

The invention claimed is:

1. A food cooking process control method, wherein the food is arranged in a cooking heat energy supply enclosure, supported on a reference surface or on a cooking surface, inserting a temperature detection device into said food, the method comprising:
   determining the thickness of the food and positioning, based on said thickness, at least one temperature detection device inside said food in a detection zone to a pre-determined insertion depth and/or at a distance from a surface through which the food absorbs cooking heat energy, by means of the aid of positioning means;
   obtaining during cooking a temperature TC in said detection zone by means of said temperature detection device at various times of the cooking process;
   processing during cooking the data of said temperature TC and the data of the temperature of one or more surfaces through which the food receives the cooking heat energy or of a detected temperature in a zone close to said cooking heat energy receiving surface TP, and estimating, for each of said times of the cooking process, a temperature gradient between the zone through which it receives the cooking heat energy and the center of the food; and
   stopping the heat energy supply when the mentioned TC plus the thermal inertia allow reaching a desired final equilibrium food temperature, result of the homogenization of said temperature gradient between the zone or zones through which the food receives the cooking heat energy and the center of the food, as a consequence of the heat energy accumulated in the food and provided by said gradient.

2. The method according to claim 1, wherein the food receives the heat energy through a surface on which it is supported, by the application of a cooking heat energy source under said food, wherein said cooking process includes at least one turn-over or cooking step to reach said desired equilibrium food temperature comprising:
   determining the time of said turn-over which will be at least one in number and which can be predefined by the user according to:
      said temperature TC of the detection device at the time prior to each turn-over;
      the evolution of the temperature of said detection zone, determined by said processing including at least one first derivative of the temperature TC; and
      said temperature gradient between the outside of the food in contact with the cooking surface and said detection zone, inside the food, and
   positioning said detection device after each turn of the food, based on the thickness of the food, to a pre-determined insertion depth and/or at a distance from a surface through which the food absorbs cooking heat energy, by means of the aid of said positioning means.

3. The method according to claim 2, wherein the temperature at the end of at least one cooking step, or calculated central temperature TCC, is determined by means of the following expression $$TCC=TC+((TP-TC)\times F)+D1+D2$$

wherein:
TC=central temperature measured at all times,
TP=temperature close to the cooking surface,
F=correction factor depending on the physical characteristics of the food, on the type of food and on the interrelation between the time derivatives of the TC and the TP, which express the value of the absorption of the heat energy received at each of the points in time and which comprise at least the thickness of said food, the water content thereof and the direction of its fibers,
D1=correction factor depending on the value of the first derivative of TC,
D2=correction factor depending on the value of the variation of the first derivative of TC or second derivative.

4. The method according to claim 2, further comprising:
inserting into the food at least two of said temperature detection devices, by means of the aid of said positioning means, placing them inside the food at a pre-determined distance which is a percentage of the thickness and/or an absolute pre-determined distance with respect to a food support surface or from the opposite food surface; and
controlling the temperature and evolution of the temperature of each of said detection devices analyzing with a certain frequency the data or readings from said temperature detection devices to know the detected central temperature TC and the calculated central temperature TCC of the food over time.

5. The method according to claim 1, further comprising detecting the temperature of said cooking surface of the food and/or detecting the room temperature of the cooking enclosure and/or detecting at least one zone of the food by means of at least one temperature detection device positioned inside said food at an absolute distance or a distance which is a percentage of the thickness with the aid of the positioning means.

6. The method according to claim 2, further comprising comparing the values of said detected central temperature TC with the value of a target central temperature TCO predefined by the user depending on the cooking point required for the food, controlling said heat source according to the result of said comparisons.

7. The method according to claim 2, further comprising:
measuring the elapsed time t1 between said application of said heat source under the food and the time at which a signal S1 has been generated, and once said food has been turned over, maintaining the application of said heat source under the food for an application time t2 according to said measured time t1; and
controlling said heat source to apply a same or different heating power during the measured time t1 before turning over the food and during the application time t2 once the food has been turned over,
wherein said control of the heat source is carried out by means of a series of pre-defined successive increments or decrements of the heating power taking into account an initial central temperature TCI of the food and the evolution of the TP or of the estimated TP.

8. The method according to claim 2, further comprising analyzing the variation of said values of the detected central temperature TC and of the detected temperature close to the cooking surface TP over time, by means of a series of readings, as well as calculating a heat absorption function of the food with respect to time, which is a slope function TP or TC obtained as a result of the evolution of the values of the temperature which are coherent over time, to establish:
that said evolution is or is not coherent according to the difference of values between every two of said readings; and
that the central temperature TC and the detected temperature close to the cooking surface TP are increasing or decreasing according to the sign of the difference between successive values and in that:
if it is established that the evolution of the values of the detected central temperature TC is not coherent, the method comprises considering the results of said comparisons of the detected central temperature TC with said target central temperature TCO as invalid until it is established that the evolution is coherent; and
if it is established that the evolution of the values of the detected central temperature TC is coherent and that the evolution of said slope function PC is negative, but that the result of said function of the calculated central temperature TCC is greater than the value of the calculated target central temperature TCCO for a consecutive number of readings, the method comprises indicating that the food is cooked;
if it established that the evolution of the values of the detected central temperature TC, after the detection of at least one turn-over of the food, is not coherent or whether or not it is coherent, the values are increasing in a number of successive readings, and greater than the value of the target central temperature TCO, the method comprises indicating that the food is cooked; and
if the detected central temperature TC reaches the value of the target central temperature TCO and the evolution of said slope function PC is positive or equal to zero for a consecutive number of prior readings and a consecutive number of readings after the time at which both temperatures TC, TCO coincide or TC>TCO, the method comprises indicating that the food is cooked.

9. The method according to claim 2, further comprising:
calculating a function of the calculated target central temperature TCCO of the food, obtained by adding to the target central temperature TCO a safety factor due to the heat loss experienced by the food when the cooking process ends:
placing said food on a surface at a temperature less than said temperature TCO, comparing the values of said calculated central temperature TCC with the value of said calculated target central temperature TCCO; and
controlling said heat source according to the result of said comparisons.

10. The method according to claim 2, further comprising calculating at least one heat absorption coefficient function of the food with respect to time, which relates the values of the detected temperature close to the cooking surface TP with an optimal heat absorption coefficient function $P_{optimal}$ and a certain constant heating power, allowing fine-tuning the heating power to be supplied by the heat source, said function or functions having two characteristics:
they are exponential equations; and
for a value of the temperature TP of 100° C., the value of the optimal heat absorption coefficient $P_{optimal}$ is equal to or close to zero and in that:
　said calculated heat absorption coefficient function of the food with respect to time is at least one slope function PP obtained as a result of the evolution of the coherent values of the detected temperature close to the cooking surface TP over time; or
　said calculated heat absorption coefficient function of the food with respect to time is an average function PPM of a slope function PP obtained as a result of the evolution of the values of the detected temperature close to the cooking surface TP over time, such that if the heating power is known said heat absorption function allows calculating the time the TP will last the food between an initial TP and another final TP.

11. The method according to claim 8, further comprising:
　calculating a function of the calculated target central temperature TCCO of the food, obtained by adding to the target central temperature TCO a safety factor due to the heat loss experienced by the food when the cooking process ends:
　placing said food on a surface at a temperature less than said temperature TCO, comparing the values of said calculated central temperature TCC with the value of said calculated target central temperature TCCO; and
　controlling said heat source according to the result of said comparisons.

12. The method according to claim 3, further comprising calculating at least one heat absorption coefficient function of the food with respect to time, which relates the values of the detected temperature close to the cooking surface TP with an optimal heat absorption coefficient function $P_{optimal}$ and a certain constant heating power, allowing fine-tuning the heating power to be supplied by the heat source, said function or functions having two characteristics:
　they are exponential equations; and
　for a value of the temperature TP of 100° C., the value of the optimal heat absorption coefficient $P_{optimal}$ is equal to or close to zero and in that:
　said calculated heat absorption coefficient function of the food with respect to time is at least one slope function PP obtained as a result of the evolution of the coherent values of the detected temperature close to the cooking surface TP over time; or
　said calculated heat absorption coefficient function of the food with respect to time is an average function PPM of a slope function PP obtained as a result of the evolution of the values of the detected temperature close to the cooking surface TP over time, such that if the heating power is known said heat absorption function allows calculating the time the TP will last the food between an initial TP and another final TP.

* * * * *